United States Patent [19]

Moriarty et al.

[11] 4,336,585
[45] Jun. 22, 1982

[54] SELECTIVE COMMUTATION FOR AN INVERTER

[75] Inventors: Robert M. Moriarty, Ballston Spa, N.Y.; John W. Walton, Glastonbury, Conn.; Samuel C. Caldwell, Raleigh, N.C.

[73] Assignee: United Technologies Corporation, Hartford, Conn.

[21] Appl. No.: 219,773

[22] Filed: Dec. 23, 1980

[51] Int. Cl.³ .............................................. H02P 13/00
[52] U.S. Cl. ...................................... 363/79; 363/136
[58] Field of Search ................. 363/79, 135, 136, 137, 363/138

[56] References Cited

U.S. PATENT DOCUMENTS

| | | | |
|---|---|---|---|
| 3,641,421 | 2/1972 | Graf et al. | 363/136 X |
| 4,131,937 | 12/1978 | Pelly et al. | 363/136 X |
| 4,180,853 | 12/1979 | Scorso, Jr. et al. | 363/135 X |
| 4,204,268 | 5/1980 | Vivirito | 363/135 |
| 4,225,912 | 9/1980 | Messer | 363/135 X |
| 4,255,783 | 3/1981 | Messer | 363/136 X |

*Primary Examiner*—William M. Shoop
*Attorney, Agent, or Firm*—Richard P. Lange

[57] ABSTRACT

A selective commutation technique used with an inverter eliminates one of the two commutation pulses at those points at which there is a particular relationship of inverter operating characteristics. The power factor angle $\theta$, the voltage phase angle $\delta$, and the voltage pattern notch angle $\beta$ are sensed to determine this particular relationship. Because at the switching point there is no current flowing through the gated thyristor, the gated thyristor can then be transitioned to the non-conducting state merely by the removal of its gate signal. A single makeup pulse is then rung through the system to initialize the commutation capacitors for the next switch point.

3 Claims, 10 Drawing Figures

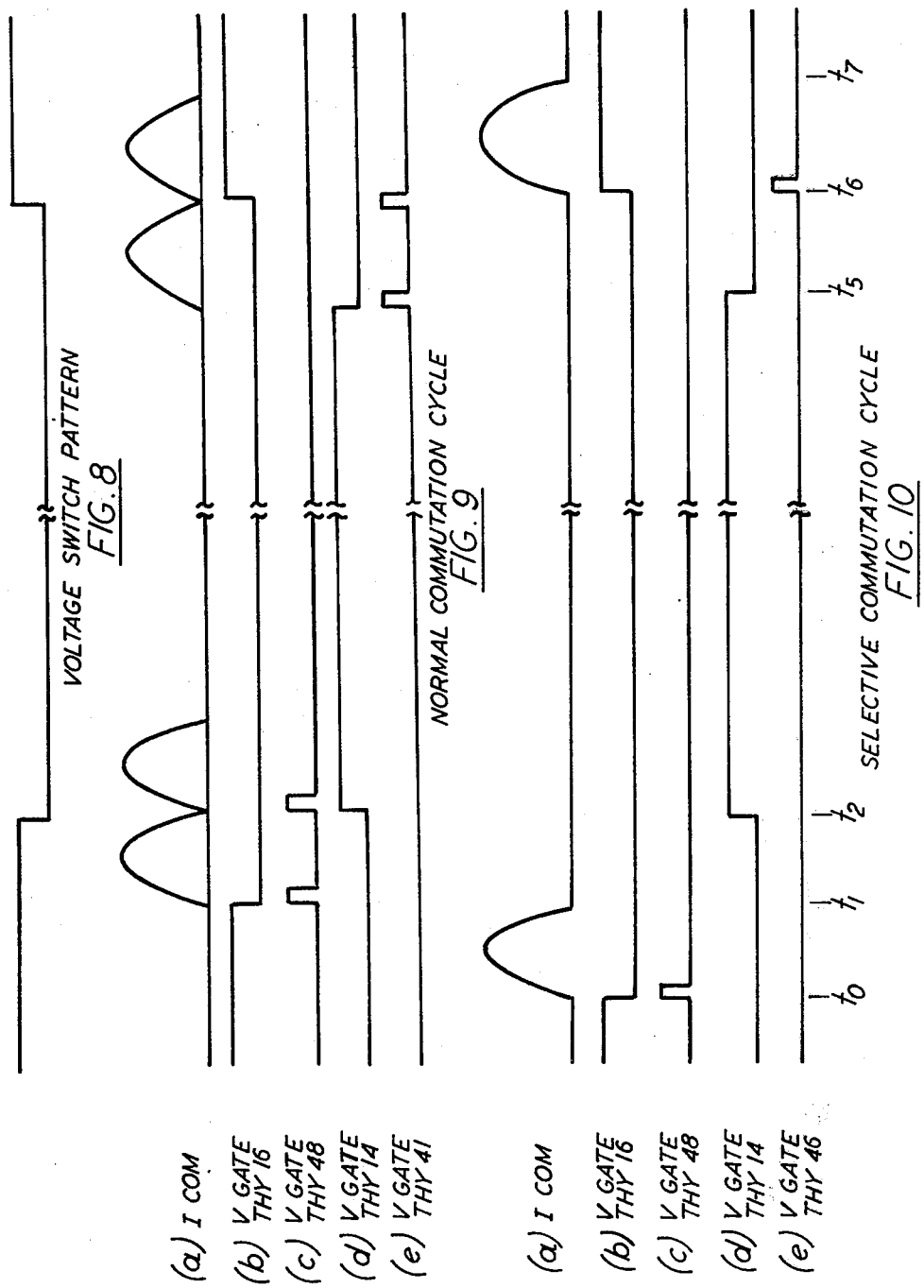

SELECTIVE COMMUTATION FOR AN INVERTER

TECHNICAL FIELD

This invention relates to inverters, and more particularly, to a control technique used in conjunction with a commutation circuit of the inverter so that preselected commutation pulses are eliminated.

BACKGROUND ART

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of main switching elements, known as thyristors, and by sequentially actuating each switching element, each DC bus is sequentially connected to the load so that electrical energy flows first in one direction and then in the reverse direction forming a fundamental AC waveform.

Numerous different types of switching devices can be employed in an inverter as a switching element to connect the DC buses to the load. One well known type, called a thyristor, is often used because of its ability to handle large currents. Although thyristors change from the nonconducting state to the conducting state in response to a suitable control signal applied to their control terminal, the reverse process, changing from the conducting state to the nonconducting state, is much more complicated. To switch to the nonconducting state, most thyristors require that the magnitude of the instantaneous anode-to-cathode current be reduced to zero, a reverse voltage be applied to the thyristor and the control signal removed from the control terminal in order to allow the thyristor to transition to its off state.

The term "commutation" has become known as the process by which a thyristor is transitioned from its conducting state to its nonconducting state and numerous circuit configurations are known for this function. Most commutation circuits operate by presenting a commutation pulse to the load from a storage device, such as a capacitor or resonant circuit, that displaces the current flowing through the thyristor and presents a reverse voltage to the thyristor. If the commutation pulse applies a reverse voltage for a period of time which exceeds the "turn-off time" of the thyristor, and the signal from the control terminal is removed, the thyristor will transition to its nonconducting state.

There is a continuing interest in improving the efficiency of the conversion of DC electrical energy to AC electrical energy by the inverter. Of interest in this area is U.S. Pat. No. 4,204,268 issued May 20, 1980 to J. Vivirito for AUXILIARY COMMUTATION CIRCUIT FOR AN INVERTER, and assigned to the same assignee as the present invention. This patent discloses an auxiliary commutation circuit of the impulse commutated bridge inverter type in which additional commutation energy is stored in a pair of oppositely charged capacitors. Switched elements in series with the capacitors are operable in response to sensed overcurrent conditions to provide additional stored energy during commutation.

Another disclosure related to the auxiliary commutation concept is U.S. Pat. No. 4,225,912 issued Sept. 30, 1980 to G. Messer for CONTROL FOR AN AUXILIARY COMMUTATION CIRCUIT, also assigned to the same assignee as the present invention. The auxiliary commutation circuit in this disclosure is actuated only during overload conditions which improves overall inverter efficiency. A control circuit responds to the increase time period of the commutation pulse to delay the firing of the thyristors which initiate the makeup pulse. This modified operation continues for at least three commutation cycles in order to ensure that the supplemental portion of the commutation circuit is properly initialized so that it is ready for subsequent overcurrent conditions.

Another efficiency improving technique is disclosed in U.S. Application Ser. No. 43,195, filed May 30, 1979 by G. Messer for SELECTIVE COMMUTATION CIRCUIT FOR AN INVERTER, and also assigned to the same assignee as the present invention. This commutation technique senses when the main thyristors cannot be transitioned to the nonconducting state by the removal of a control signal to the gate terminal of the main thyristors. If a commutation pulse from the commutation circuit is required, the commutation capacitors are charged to the appropriate voltage level immediately prior to the commutation point so that there is a sufficient pulse to extinguish the load current through the thyristor. After commutation, the commutation capacitors are returned to a stable voltage level until another commutation pulse is required.

DISCLOSURE OF THE INVENTION

It is an object of the present invention to provide a commutation circuit for an inverter which operates only when commutation is required thereby improving efficiency.

According to a feature of the present invention, a selective commutation technique for an inverter reduces the number of commutation pulses over what is normally required on a per-cycle basis. This selective commutation technique is incorporated in such a manner that the inverter output voltage waveform is not altered.

According to another aspect of the present invention, a control circuit for an inverter utilizes a technique in which the commutation pulses are displaced in time with respect to normal commutation. The direction of displacement is dependent upon the circuit conditions at the time of commutation. Then in the event that the main thyristor can be transitioned to its nonconducting state by merely the removal of the control pulse, the necessity for utilizing the second of the two pulses is eliminated.

According to a feature of the present invention, a selective commutation circuit for a split "C" type inverter includes a logic technique which eliminates some of the commutation pulses. Normally, two commutation pulses are required to transition the conducting thyristor into its nonconducting state and reset the commutation capacitors to the correct state. The first pulse then displaces the load current in the thyristor so that when the gate signal is removed and a reverse voltage applied to the thyristor, the thyristor switches to its nonconducting state. The second commutation pulse is a "makeup" pulse which charges or initializes the capacitors of the commutation circuit to the proper voltage level and polarity for the next commutation. If the phase relationship between the voltage and current waveform are such that no current is flowing through the thyristor being gated by the control signal at the time the turn-off transition is required, then the first pulse is eliminated and the thyristor changes to its nonconducting state upon removal of the gate signal.

According to another feature of the present invention, selected commutation pulses at each switch point in the operation of an inverter are eliminated thereby improving inverter efficiency in reducing stress on the circuit components.

The foregoing and other objects, features and advantages of the present invention will become more apparent from the following description of preferred embodiments and accompanying drawings.

BRIEF DESCRIPTION OF DRAWINGS

FIG. 8 depicts portions of a voltage switching waveform pattern presented to the main thyristors;

FIG. 9 depicts a normal commutation cycle of the inverter at the switching point shown in FIG. 8; and FIG. 10 depicts a selective commutation cycle of the inverter at the switch points shown in FIG. 8.

BEST MODE FOR CARRYING OUT THE INVENTION

Figure 1:
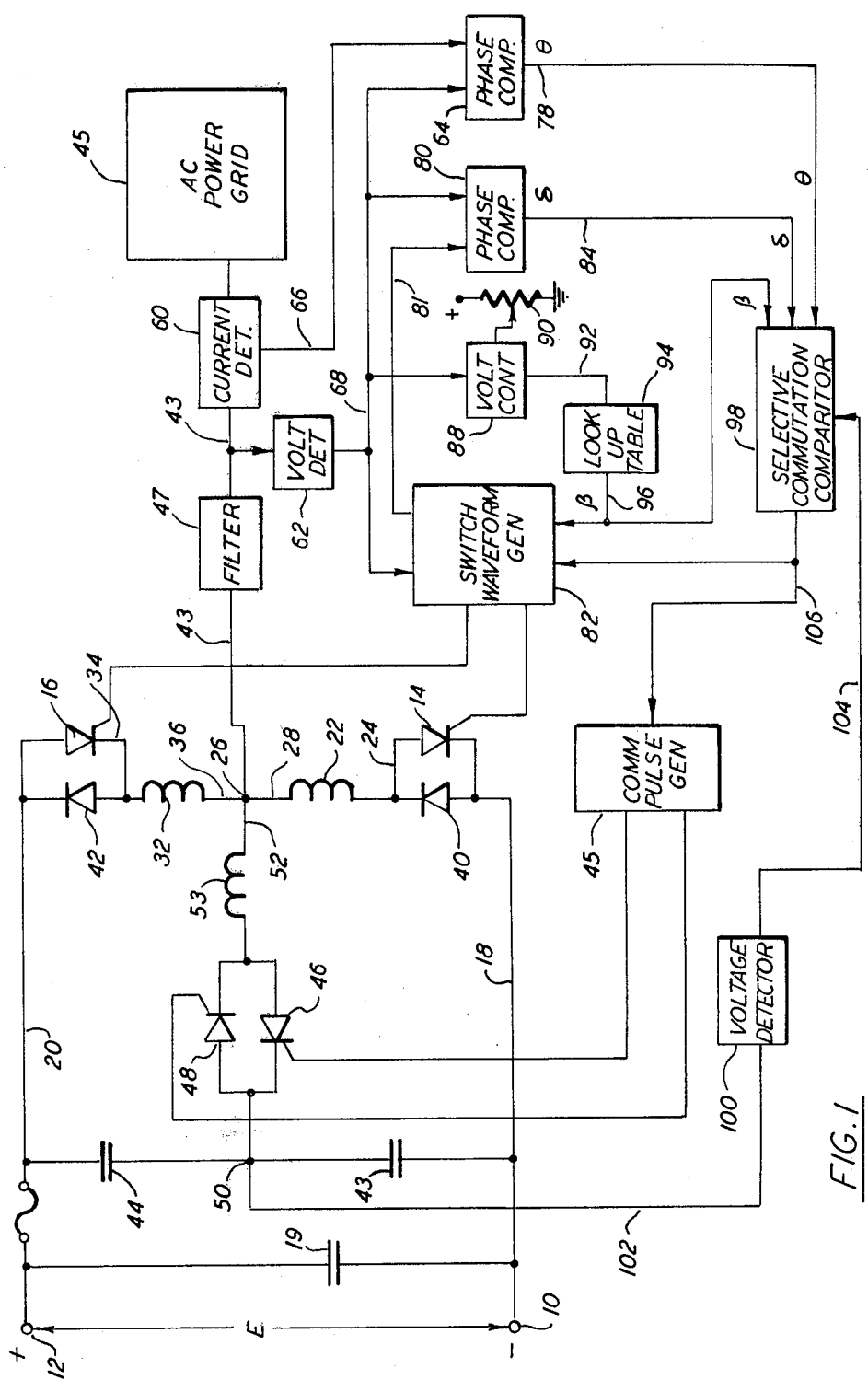
FIG. 1 is a block diagram of a power inverter including a control circuit implementing the selective commutation technique of the present invention.

Referring initially to FIG. 1, one embodiment of the selective commutation circuit of the present invention is illustrated in conjunction with a typical DC-to-AC power inverter. As is known, a power inverter includes a negative bus 10 and a positive bus 12 which receive DC electrical energy from an external source (not shown), such as a fuel cell or the like. While this embodiment depicts a single half-bridge connected across the negative bus 10 and positive bus 12, it should be understood that any number of half-bridges could be used and multiphase output power can be formed from a plurality of properly phased half-bridges in a manner well known to those of ordinary skill. A pair of main semiconductor switches, such as thyristor 14 and thyristor 16, are connected by leads 18 and 20, respectively, to the negative bus 10 and the positive bus 12. Also connected across the leads 18 and 20 is an input capacitor, capacitor 19. On the negative side of the inverter an inductor 22 is connected by a lead 24 to the anode side of the thyristor 14 while the other end of the inductor 22 is connected to the output node 26 by a lead 28. In a similar manner, on the positive side an inductor 32 is connected by a lead 34 to the cathode of the thyristor 16 while the other end of the inductor 32 is connected to the output node 26 by a lead 36. A diode 40 is connected between the anode and cathode of the thyristor 14 on the negative side of the inverter while a diode 42 is connected between the anode and cathode of the thyristor 16 on the positive side of the inverter. These diodes provide a pathway for current through the inverter to the input buses in a reverse direction to that provided by the thyristors. Finally, an output bus 43 leads from the output node 26 to the AC power grid 45 which is the load to which power can be delivered through the inverter. A filter 47 is normally provided along the output bus 43, and it is selected and sized to match the characteristics of the inverter for filtering out undesired harmonic components from the voltage waveform presented to AC power grid 45. Often, the filter 47 may include, or be part of, a transformer or the like which changes the voltage/current magnitudes of the output voltage and current waveform from the inverter in the known manner.

A particular feature of the selective commutation circuit of the present invention is that it reduces under certain conditions the number of times that a commutation circuit must be actuated to commutate the thyristor 14 and the thyristor 16. As is known, the thyristor 14 and the thyristor 16 change from their nonconducting state to their conducting state almost instantaneously in response to the application of a suitable control signal to their control terminals. However, in order to change a thyristor from its conducting state to its nonconducting state, the current therethrough must be reduced to zero and a reverse voltage applied to the thyristor for a predetermined period of time, known as the turnoff time, and the control signal removed from its control terminal, before the thyristor transitions to its blocked state. The process by which a thyristor is transitioned from its conducting to its blocked state is known as "commutation".

Still referring to FIG. 1, the commutation circuit used with the present invention includes a commutation capacitor 43 and a commutation capacitor 44, these capacitors being coupled between the negative input bus 10 and the positive input bus 12 so that the source voltage E is divided thereacross. A pair of thyristors, such as a thyristor 46 and a thyristor 48, are coupled in a back-to-back configuration, and then this combination is connected from a node 50 between the two commutation capacitors, by a line 52 to the output node 26. A commutation pulse generator 45 provides properly timed commutation pulses to switch the thyristors 46 and 48. The thyristors 46 and 48 are normally smaller in size than the main switching thyristors 14 and 16 thus having a lower current carrying capacity. An inductor 53 is provided in the line 52.

A particular feature of the selective commutation circuit according to the present invention is that the gate control signal of the main thyristors 14 and 16 of the half-bridge, the direction of the current flow to the AC power grid 45, and the state of the commutation capacitor is determined. Then, under certain conditions, the main thyristors can be turned off by merely removing their gate signals rather than using a current pulse from the commutation circuit to extinguish the thyristor current and apply a reverse voltage to the thyristor. For the purposes of explanation, a simple dedicated logic circuit is shown in FIG. 1 for performing the decision-making steps in conjunction with the illustrated inverter. However, it should be understood that numerous other logic circuits could be used for making this step-by-step decision procedure, such as a suitably programmed microprocessor or equivalent. With the continually decreasing cost and increased reliability, microprocessors are well suited for controlling an inverter. The thyristor switching points can be identified through consideration of the switching pattern notch angle $\beta$, the voltage phase difference 6, which is the phase angle between the voltage from the inverter and the voltage of the AC power grid 45, and the power factor angle $\theta$ which is the phase difference between the voltage waveform and the current waveform presented to the AC power grid 45. In deriving these parameters, the present invention employs a current detector 60 positioned in the line 43 to sense the current presented to the AC power grid 45. A voltage detector 62 measures the magnitude and phase of the voltage waveform on the line 43, this essentially being the voltage waveform associated with the AC power grid 45. A phase comparator 64 is connected to the current detector 60 by a line 66 and also is connected to the voltage detector 62 by a line 68. The phase comparator 64 senses the difference in phase between the voltage waveform and current waveform and provides on the line 78 a signal $\theta$, known as the power factor angle. A phase comparator 80 is also connected to line 68 and the voltage detector 62 and also by a line 81 to a switching waveform generator 82. The phase comparator 80 then compares the phase of the voltage generated by the inverter with the phase of the voltage of the AC power grid 45 to derive a voltage phase angle $\delta$ at its output on line 84. Finally, the voltage pattern notch angle $\beta$ is the angle associated with the notch within the switching waveform pattern which is used to transition the main thyristors 14 and 16 between their conducting and nonconducting states. A voltage controller 88 is also connected to the line 68 to sense the magnitude of the voltage level presented to the AC power grid 45. This is compared with a reference, such as the variable source level 90, to generate on a line 92 a signal indicative of the desired output voltage level. This may then be presented to look-up table 94. The look-up table 94 has stored therein values of $\beta$ which correspond to a certain desired voltage level out of the inverter. Accordingly, the look-up table 94 presents a pattern notch angle signal $\beta$ at its output on line 96 to the switching waveform generator 82 which develops the actual switching waveforms presented to the main thyristors.

A selective commutation comparator 98 is provided and it is the unit which senses the inverter parameters to determine if selective commutation is appropriate. The selective commutation comparator 98 is connected to the line 96, the line 84 and the line 78 to receive the notch angle signal $\beta$, the voltage phase angle signal $\delta$ and the power factor angle signal $\theta$, respectively. A voltage detector 100 is connected by a line 102 to the node 50 between the commutation capacitors 43 and 44 to sense the magnitude and polarity of the voltage on the auxiliary commutation capacitors 43 and 44. The voltage detector 100 then provides an output signal via a line 104 to the selective commutation comparator 98 which is indicative of the voltage condition at the node 50. The selective commutation comparator 98 then makes a comparison of all these input parameters and determines if selective commutation is appropriate. If so, a signal is provided to the commutation pulse generator 45 and the switch waveform generator 82 via the line 106 indicating that the selective commutation mode should be implemented.

Figure 2:
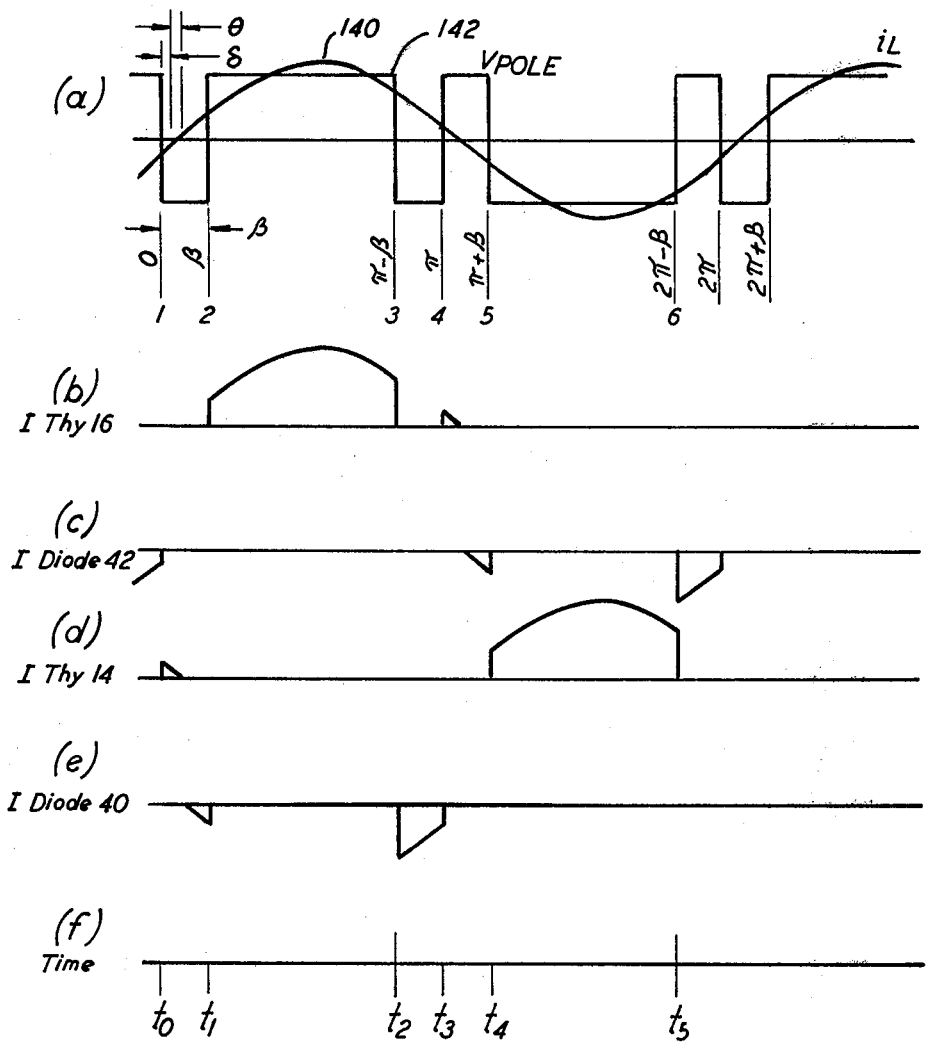
FIGS. 2-7 depict certain voltage and current waveforms during various operating conditions of the inverter, some of which are suitable for selective commutation according to the present invention.
Figure 3:
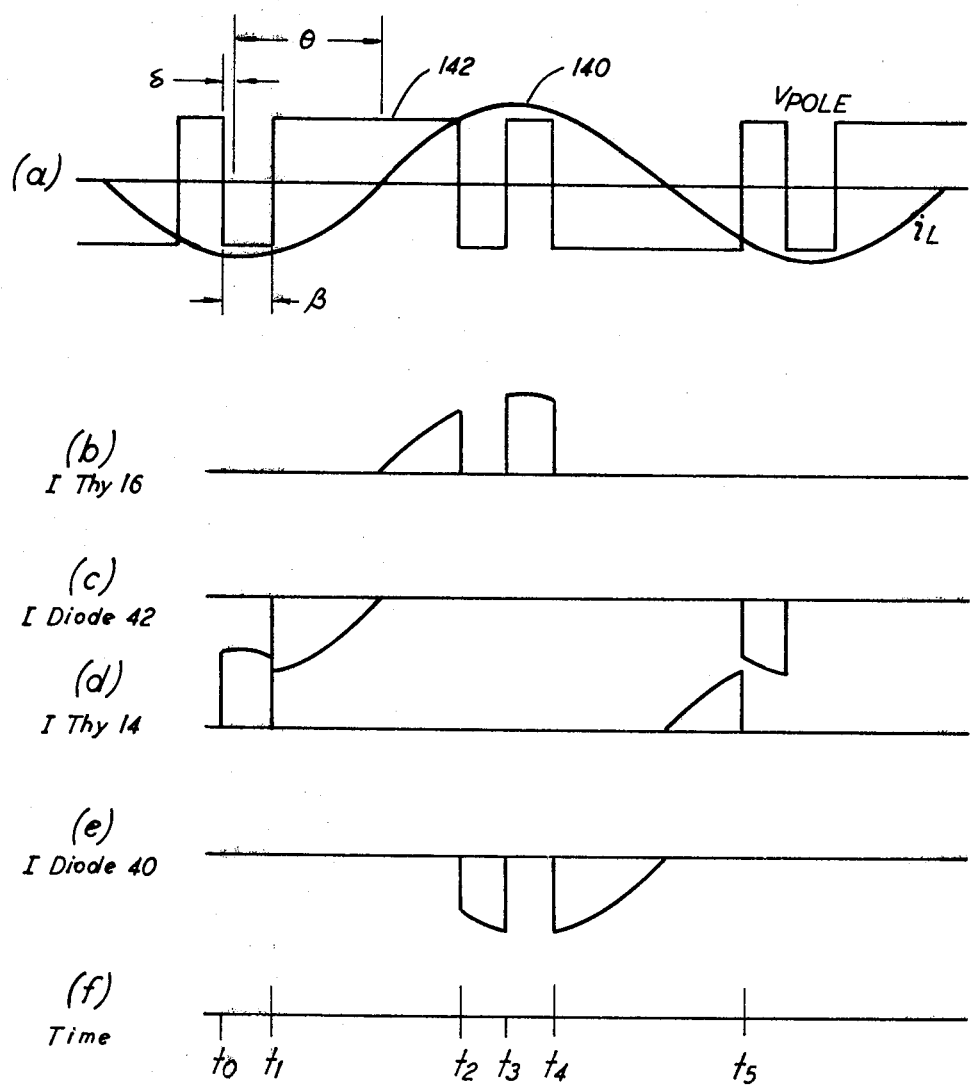
Figure 4:
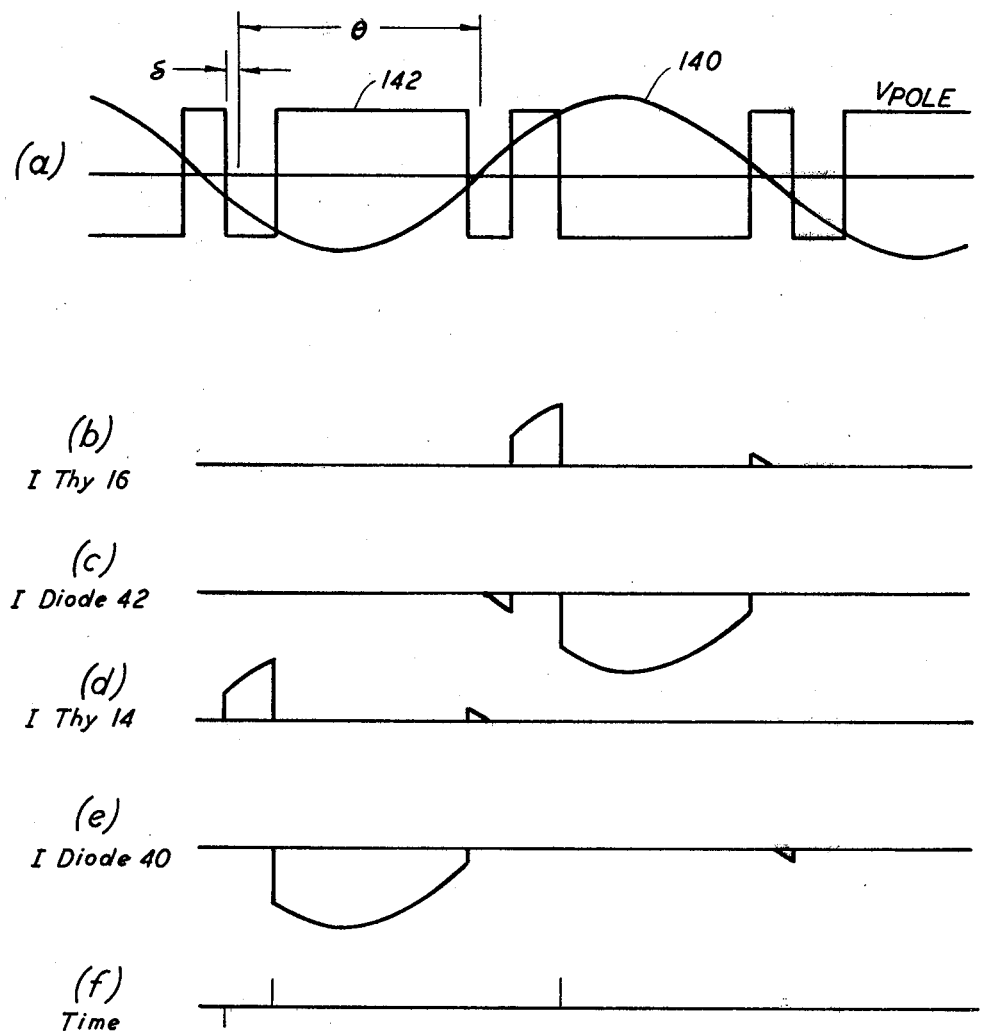
Figure 5:
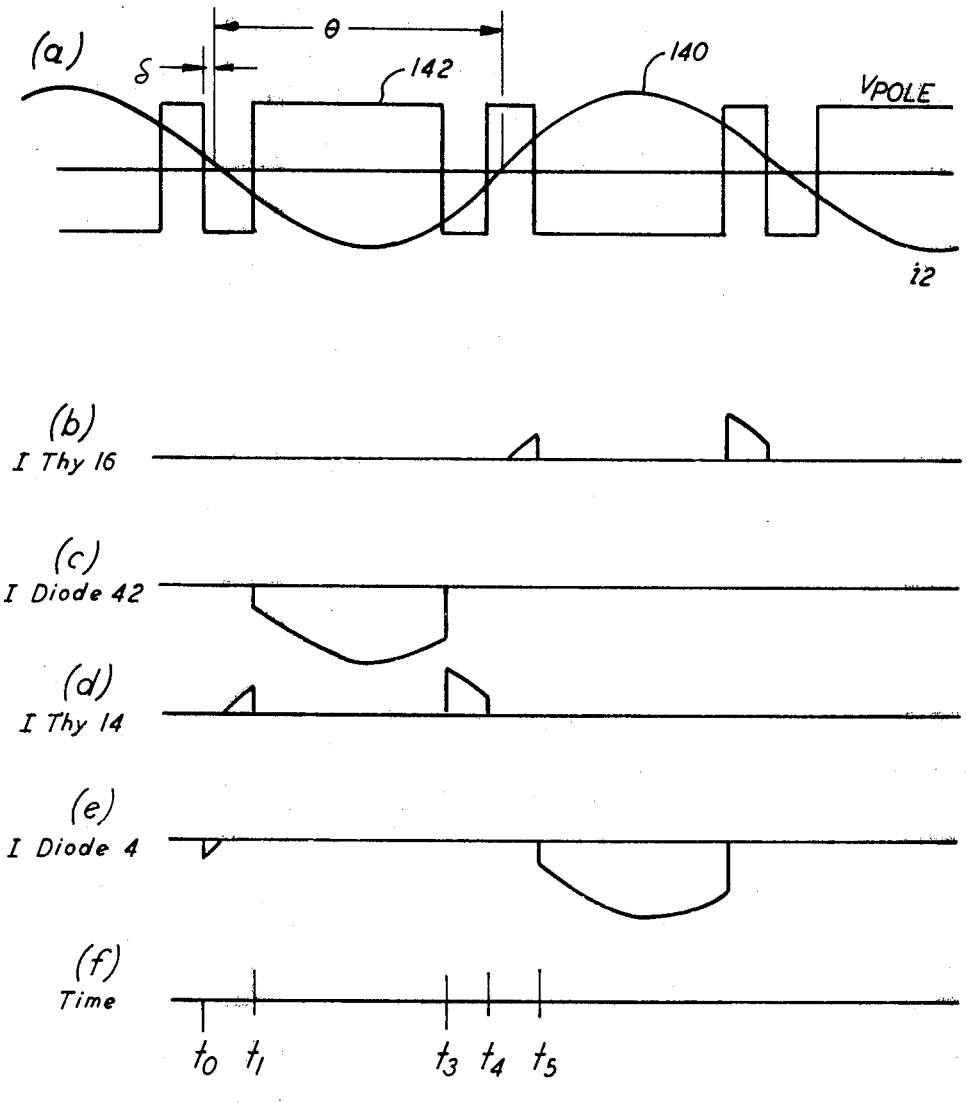

Referring next to FIGS. 2–6, there is seen a drawing of the voltage and current waveform under several conditions, some of which result in a reduction of commutation pulses and others which do not. Referring now to FIG. 2, there is seen one selective commutation mode, this particular mode being a condition in which the number of commutation pulses is reduced by one-third. In other words, a commutation pulse can be saved whenever the phase relationship between the voltage waveform and the current waveform are such that the gated thyristor has no current in its anode-to-cathode path. Under these circumstances the power factor angle $\theta$ is such that the current is flowing through the diode which is coupled across the gated thyristor. For example, just prior to time $t_0$ the thyristor 16 is in its on state but the current flow, waveform 140, is negative such that current flow is through the diode 42. Accordingly, at time $t_0$ the thyristor 16 can be commutated to its off state by merely removing the gate signal from its control terminal. The thyristor 14 is then gated on until the next switch point which occurs at time $t_1$. Accordingly, at this time $t_0$ when there is normally two commutation pulses, only one is required, that being the makeup pulse which initializes the commutation capacitors, capacitor 43 and capacitor 44 for the next commutation cycle. Following the just aforementioned description, it will be apparent that only a makeup commutation pulse is required in FIG. 1 at time $t_0$, time $t_3$ and time $t_4$ which results in a saving of four of the normal twelve commutation pulses. Of course then at time $t_2$ and time $t_5$ normal commutation takes place.

Figure 6:
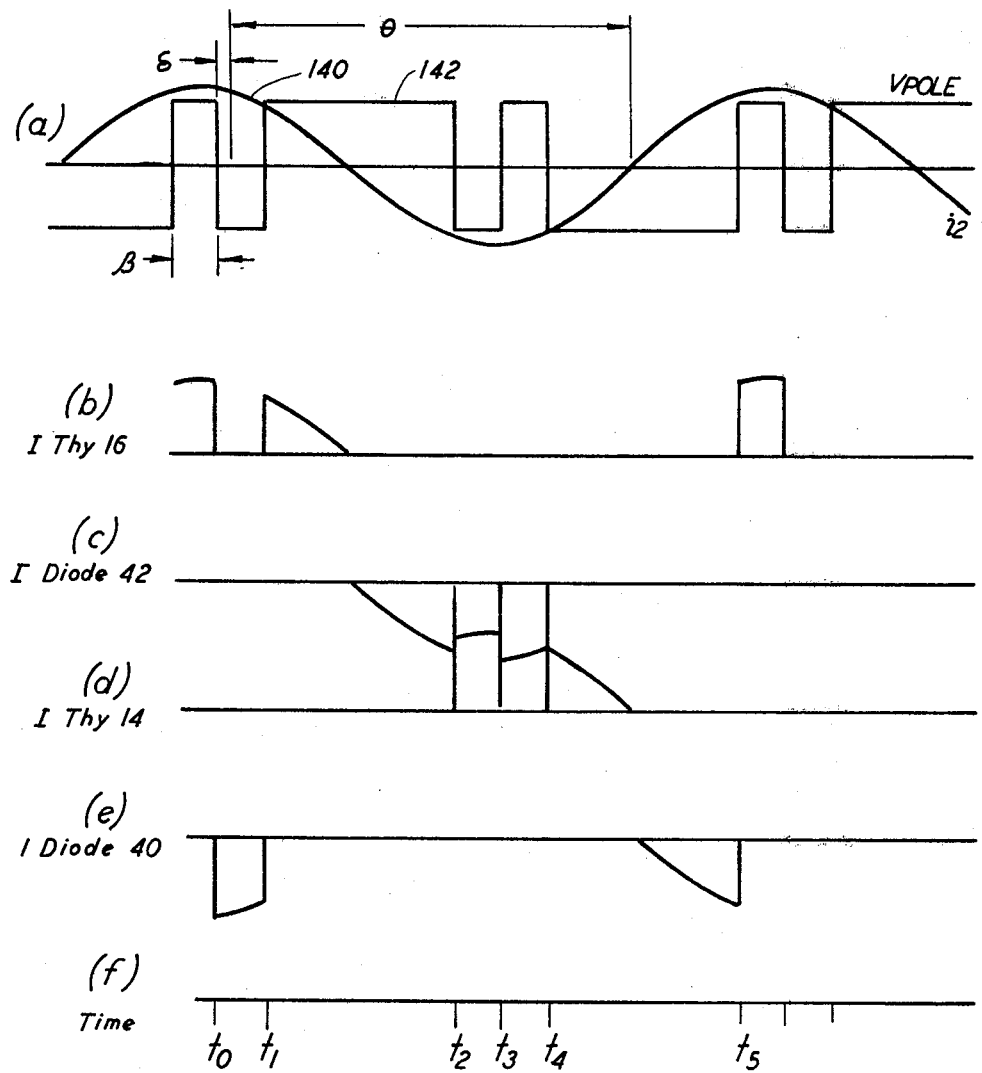
Figure 7:
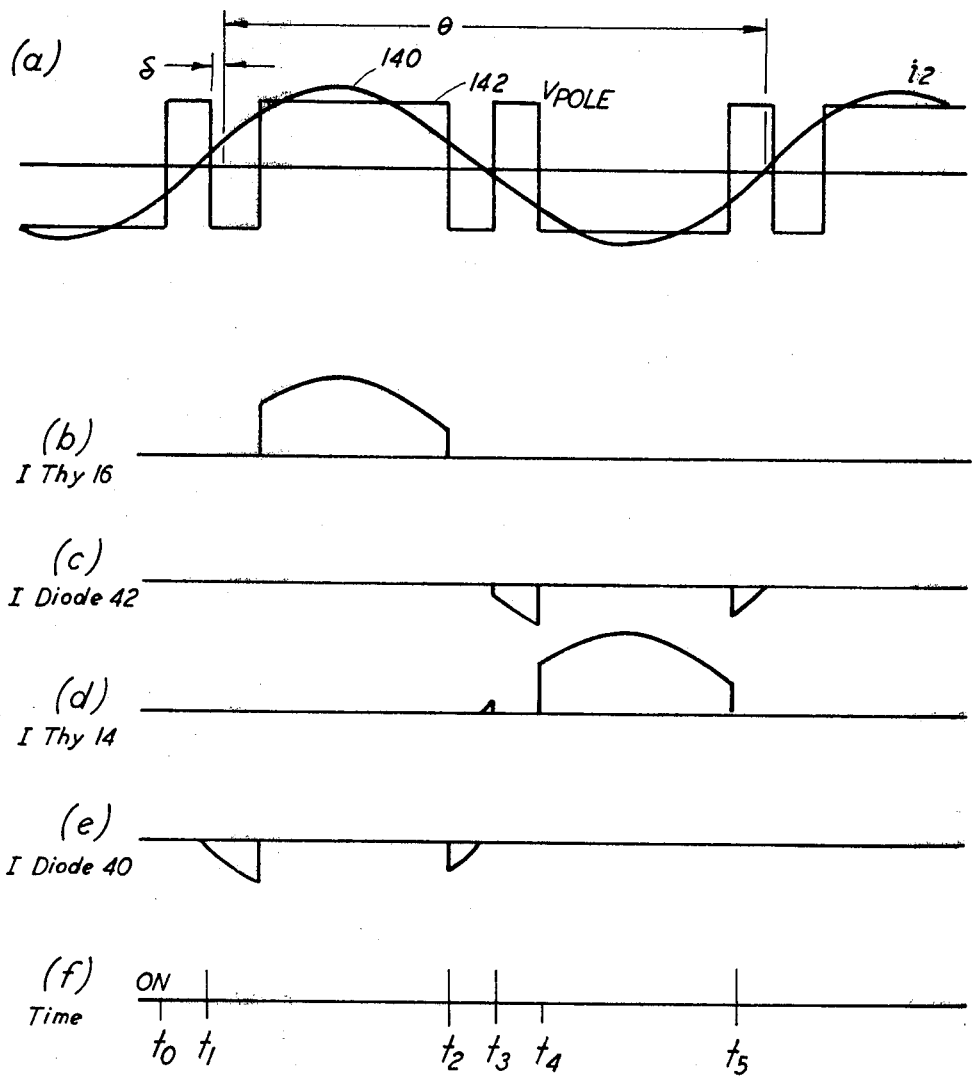

Referring next to FIG. 6, there is seen another condition of the selective commutation mode, this being one in which the phase relationship between the voltages and load current are such that the number of commutation pulses normally occurring during one cycle of the inverter switching waveform 142 can be reduced by four. It will be noted that just prior to time $t_0$ the thyristor 16 is conducting the load current, waveform 140, so at time $t_0$ a normal commutation of two pulses must occur. However, just prior to time $t_1$, while the thyristor 14 is in the on state, it is the diode 40 which is conducting the load current so that the thyristor 14 can be turned off merely by removing the signal from the control terminal. Therefore, at time $t_1$ the control signal is removed from the control terminal of the thyristor 14 allowing it to switch to the blocked state and one makeup pulse is rung through the inverter to initialize the commutation capacitors for the next switch point. As will be appreciated, only one commutation pulse is required at time $t_2$, time $t_4$ and time $t_5$ while the normal commutation cycle of two pulses is required at time $t_0$ and time $t_3$.

In the other normally occurring conditions, those illustrated by FIGS. 3–5 and FIG. 7, the phase relationship between the line current, waveform 140, and the inverter switching pattern 142 is such that a normal commutation must occur. This means that both the extinguishing pulse and the makeup pulse must be rung through the circuit.

A particular feature of the selective commutation technique according to the present invention is that at certain switching points only one commutation pulse is required, and that particular pulse is moved by one pulse width while the switching point for the transition of the alternate thyristor is left unaltered. Referring now to FIG. 8, there is seen a portion of the voltage switch pattern, this depicting certain switch points as seen in FIGS. 1–7. It will be noted that prior to time $t_0$ thyristor 16 is conducting that by time $t_2$ the thyristor 16 must be off so that the thyristor 14 can be gated on. In a similar manner, by time $t_6$ the thyristor 14 is to be off so that the thyristor 16 can be switched on.

Referring additionally to FIG. 9, there is seen a normal commutation cycle which must be implemented in order to make this transition, this consisting of two commutation pulses. It will be observed that at time $t_1$ the gate signal of the thyristor 16 is removed and the thyristor 48 is pulsed to initiate a commutation pulse. Then at time $t_2$ the thyristor 48 is again gated to form a makeup pulse for initializing the commutation capacitors 43 and 44.

However, as mentioned herebefore under certain circumstances when there is no line current through the gated thyristor, then the conducting thyristor can be transitioned to the nonconducting state merely by the removal of the gate signal. Referring additionally to FIG. 10, there is seen two such conditions. At time $t_0$, since the thyristor 16 has no load current in its anode-to-cathode path, it can be transitioned to the nonconducting state merely by the removal of the control signal from its control terminal. Simultaneously, at this time $t_0$, the thyristor 48 is gated to the on state initiating a makeup pulse which rings up the capacitor 42 and 44 to the appropriate charge for the next commutation cycle. Finally, at time $t_2$ the actual switch point occurs and the thyristor 14 is gated to its on condition. It will be appreciated that by a cmparison at time $t_2$ in FIG. 9 and FIG. 10, there is no change in time of the switching point at time $t_2$. As mentioned, at time $t_6$ there is a switching point at which the thyristor 16 is gated on. The various waveforms can be seen for a normal commutation cycle—FIG. 9, and also for the selective commutation cycle—FIG. 10.

Although this invention has been shown and described with respect to a preferred embodiment, it will be understood by those skilled in this art that various changes in form and detail thereof may be made without departing from the spirit and scope of the claimed invention.

We claim:

1. A selective commutation circuit for use with an inverter which transforms DC electrical energy from a source providing a negative input and a positive input to AC electrical energy at an output node, comprising:
   main switch means responsive to a control waveform for alternatively connecting said positive input to said output node, and connecting said negative input to said output node;
   commutation means for providing a pulse of stored energy to displace that from said source to said output node at preselected times in response to commutation control pulses so that said main switch means can be transitioned to its nonconducting state; and
   comparator means of sensing the phase relationship of preselected waveforms related to said inverter operation and for modifying said commutation control pulses in the event that said main switch means can be transition to the off state merely by the removal of a control pulse.

2. A selective commutation circuit for use with an inverter according to claim 1, wherein said commutation means further includes a pair of unidirectional switches connected in a back-to-back configuration between a pair of commutation capacitors and said output node, and wherein a comparator means is provided to sense the voltage across said pair of commutation capacitors.

3. A selective commutation circuit according to claim 2, wherein said commutation means further includes a commutation pulse generator, and wherein only one commutation pulse is required to properly prepare said commutation capacitor for the next switching transition.

* * * * *